US012566361B2

(12) United States Patent
Liang et al.

(10) Patent No.: US 12,566,361 B2
(45) Date of Patent: Mar. 3, 2026

(54) ADJUSTABLE SEAT AND CAMERA

(71) Applicant: VIVOTEK INC., New Taipei City (TW)

(72) Inventors: Hsiao-Lung Liang, New Taipei City (TW); Chang-Ping Hu, New Taipei City (TW); Wei-Jie Weng, New Taipei City (TW)

(73) Assignee: VIVOTEK INC., New Taipei City (TW)

( * ) Notice: Subject to any disclaimer, the term of this patent is extended or adjusted under 35 U.S.C. 154(b) by 130 days.

(21) Appl. No.: 18/415,575

(22) Filed: Jan. 17, 2024

(65) Prior Publication Data

US 2024/0329497 A1 Oct. 3, 2024

(30) Foreign Application Priority Data

Mar. 29, 2023 (TW) .................................. 112111987

(51) Int. Cl.
*G03B 17/56* (2021.01)

(52) U.S. Cl.
CPC .................................. G03B 17/561 (2013.01)

(58) Field of Classification Search
CPC ..... B25J 17/0283; F16M 11/18; G03B 17/561
See application file for complete search history.

(56) References Cited

U.S. PATENT DOCUMENTS

| | | | |
|---|---|---|---|
| 2014/0219647 A1 | 8/2014 | Lai | |
| 2014/0375745 A1* | 12/2014 | Hoelsaeter | H04N 7/15 396/428 |
| 2021/0031383 A1* | 2/2021 | Shannon | F16H 1/2854 |

FOREIGN PATENT DOCUMENTS

| | | |
|---|---|---|
| CN | 109611657 A | 4/2019 |
| CN | 209909455 U | 1/2020 |
| CN | 210106947 U | 2/2020 |

* cited by examiner

*Primary Examiner* — Noam Reisner
(74) *Attorney, Agent, or Firm* — Winston Hsu

(57) ABSTRACT

An adjustable seat includes a mount, a rotary base, a rotary fixing frame, a fixing frame transmission mechanism, and a fixing frame driving module. The rotary base is rotatably connected to the mount and is rotatable around a first rotation axis relative to the mount. The rotary fixing frame is rotatably connected to the rotary base and is rotatable around a second rotation axis relative to the rotary base. The fixing frame transmission mechanism is rotatably connected to the rotary fixing frame. The fixing frame driving module is disposed on the mount and connects with the fixing frame transmission mechanism. The fixing frame driving module drives the rotary fixing frame through the fixing frame transmission mechanism to rotate around the second rotation axis relative to the rotary base. A camera includes the adjustable seat and an image-capturing module fixed on the rotary fixing frame for capturing images.

16 Claims, 11 Drawing Sheets

144

1444

1442a

1444

1446

1442

ADJUSTABLE SEAT AND CAMERA

BACKGROUND OF THE INVENTION

1. Field of the Invention

The present invention relates to a camera, and more particularly to an adjustment of the image-capturing direction of the camera.

2. Description of the Prior Art

At present, some surveillance cameras are designed to be structurally fixed. After the camera is installed (e.g., fixed on a ceiling or wall), its image-capturing direction is also fixed. If the image-capturing direction is required to be adjusted, in principle the camera needs to be removed and reinstalled according to the required image-capturing direction. Some surveillance cameras are designed with parts of the structure that can be adjusted manually. After the camera is installed, its image-capturing direction can still be adjusted manually. For example, a user does not need to remove the camera, but can use hands or hand tools to rotate or adjust the relative positions of the movable parts to obtain the required image-capturing direction. Some surveillance cameras are designed with parts of the structure electrically adjustable. After the camera is installed, its image-capturing direction can still be controlled remotely. For example, a user or application can remotely control the operation of a driving mechanism (used to rotate or adjust (for example, using a motor as a power source) the relative position of a movable part) to adjust the image-capturing direction. In this type of electrically adjustable surveillance camera, if it can provide multi-dimensional adjustment of the image-capturing direction (e.g., using a structural design with multiple connected moving parts, in which, for example, one moving part is rotatably connected to another moving part, thereby achieving adjustments in the horizontal and vertical directions), in principle, a motor will be installed on the movable part, which increases the rotation or movement inertia of this movable part, making rotation or movement more difficult, stability difficult to maintain, and adjustment accuracy difficult to be improved. In addition, cables connected to the motor on the movable part may interfere with the movement of the movable part or other movable parts, and may also increase restrictions on the layout of connection cables of other electronic components.

SUMMARY OF THE INVENTION

In view of the problems in the prior art, an objective of the invention is to provide an adjustable seat for a camera. The adjustable seat uses a transmission mechanism to transmit motion, so that a drive module that provides power can be disposed on an immovable part.

An adjustable seat of an embodiment according to the invention includes a mount, a rotary base, a rotary fixing frame, a fixing frame transmission mechanism, and a fixing frame driving module. The rotary base is rotatably connected to the mount. The rotary base is rotatable around a first rotation axis relative to the mount. The rotary fixing frame is rotatably connected to the rotary base. The rotary fixing frame is rotatable around a second rotation axis relative to the rotary base. The fixing frame transmission mechanism connects with the rotary fixing frame. The fixing frame driving module is disposed on the mount and connects with the fixing frame transmission mechanism. The fixing frame driving module drives the rotary fixing frame through the fixing frame transmission mechanism to rotate around the second rotation axis relative to the rotary base.

Another objective of the invention is to provide a camera with the above adjustable seat. Therefore, in the camera, the adjustable seat uses the transmission mechanism to transmit motion, so that the driving module that provides power can be placed on an immovable part.

A camera of an embodiment according to the invention includes an adjustable seat and an image-capturing module. The adjustable seat includes a mount, a rotary base, a rotary fixing frame, a fixing frame transmission mechanism, and a fixing frame driving module. The rotary base is rotatably connected to the mount. The rotary base is rotatable around a first rotation axis relative to the mount. The rotary fixing frame is rotatably connected to the rotary base. The rotary fixing frame is rotatable around a second rotation axis relative to the rotary base. The fixing frame transmission mechanism connects with the rotary fixing frame. The fixing frame driving module is disposed on the mount and connects with the fixing frame transmission mechanism. The fixing frame driving module drives the rotary fixing frame through the fixing frame transmission mechanism to rotate around the second rotation axis relative to the rotary base. The image-capturing module is fixed on the rotary fixing frame for capturing images.

Thereby, in the adjustable seat and the camera with the adjustable seat, because of the disposition of the fixing frame transmission mechanism, the fixing frame driving module provided on the immovable part (i.e., the mount) can indirectly drive the rotary fixing frame to rotate through the fixing frame transmission mechanism, thereby achieving the effect of adjusting the image capturing direction (of the image-capturing module disposed on the rotary fixing frame). Furthermore, because the fixing frame driving module is disposed on the immovable mount, cables connected to the fixing frame driving module do not need to be arranged on other movable parts (e.g., the rotary base and the rotary fixing frame), thereby preventing the cables from interfering with the movement of other movable parts, and reducing the restriction of the cables on the layout of connection cables of other electronic components (e.g., the image-capturing module disposed on the rotary fixing frame). Furthermore, because the fixing frame driving module is not disposed on the rotary base, the rotational inertia of the rotary base will not be increased due to the fixing frame driving module, and the rotation control of the rotary base will not be affected by the disposition of the fixing frame driving module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
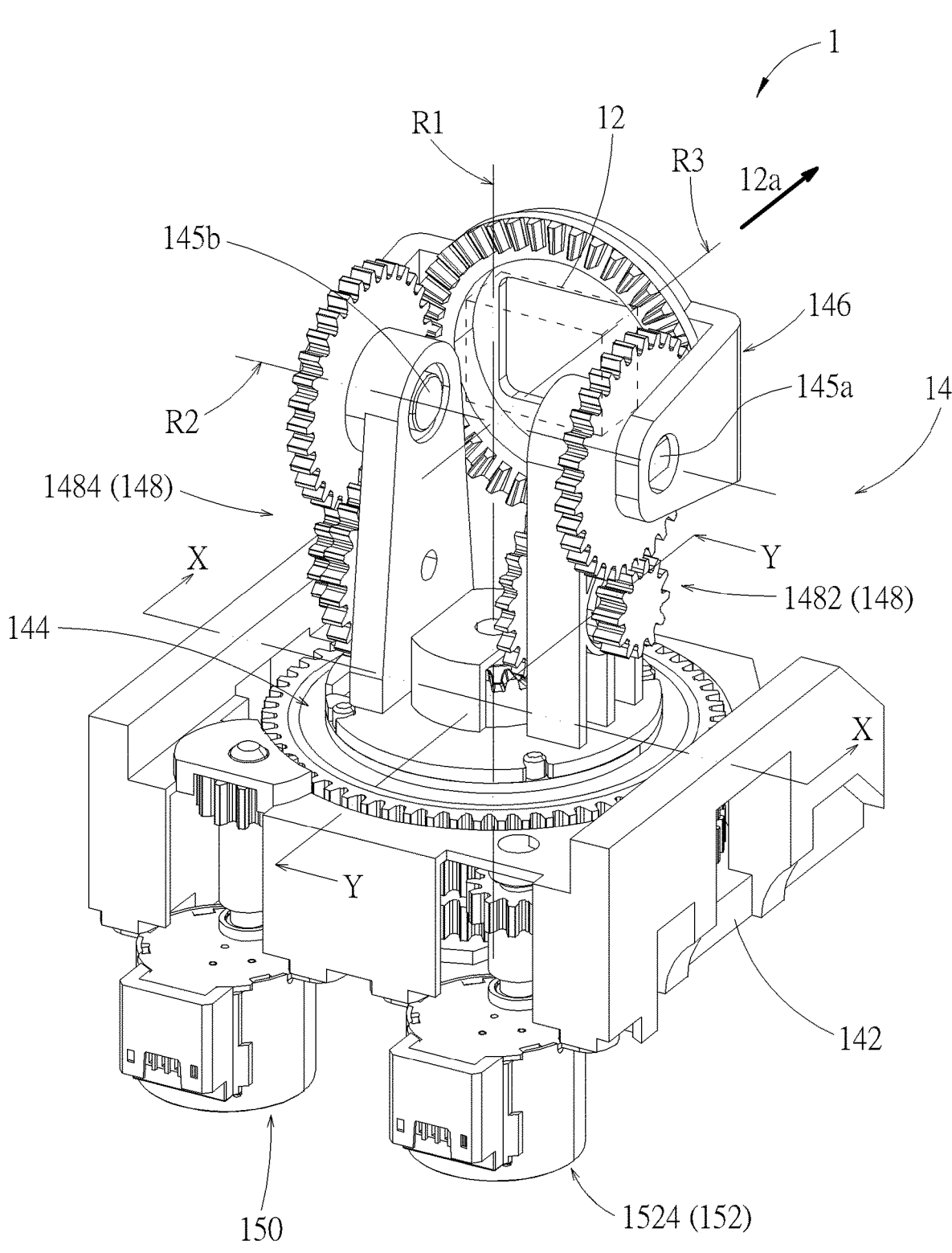
FIG. 1 is a schematic diagram illustrating part of a camera according to an embodiment.
Figure 2:
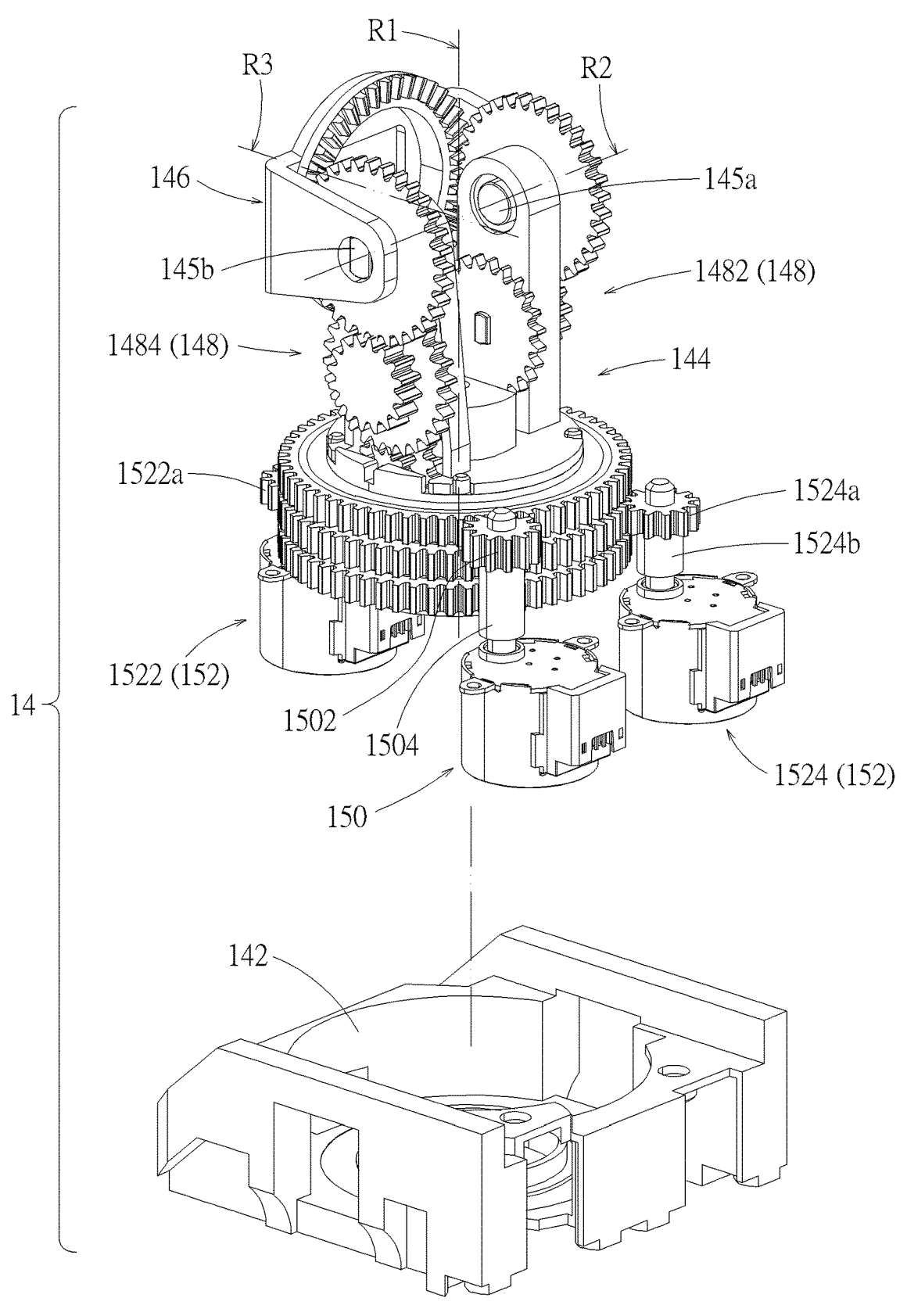
FIG. 2 is a partially exploded view of an adjustable seat of the camera in FIG. 1.
Figure 3:
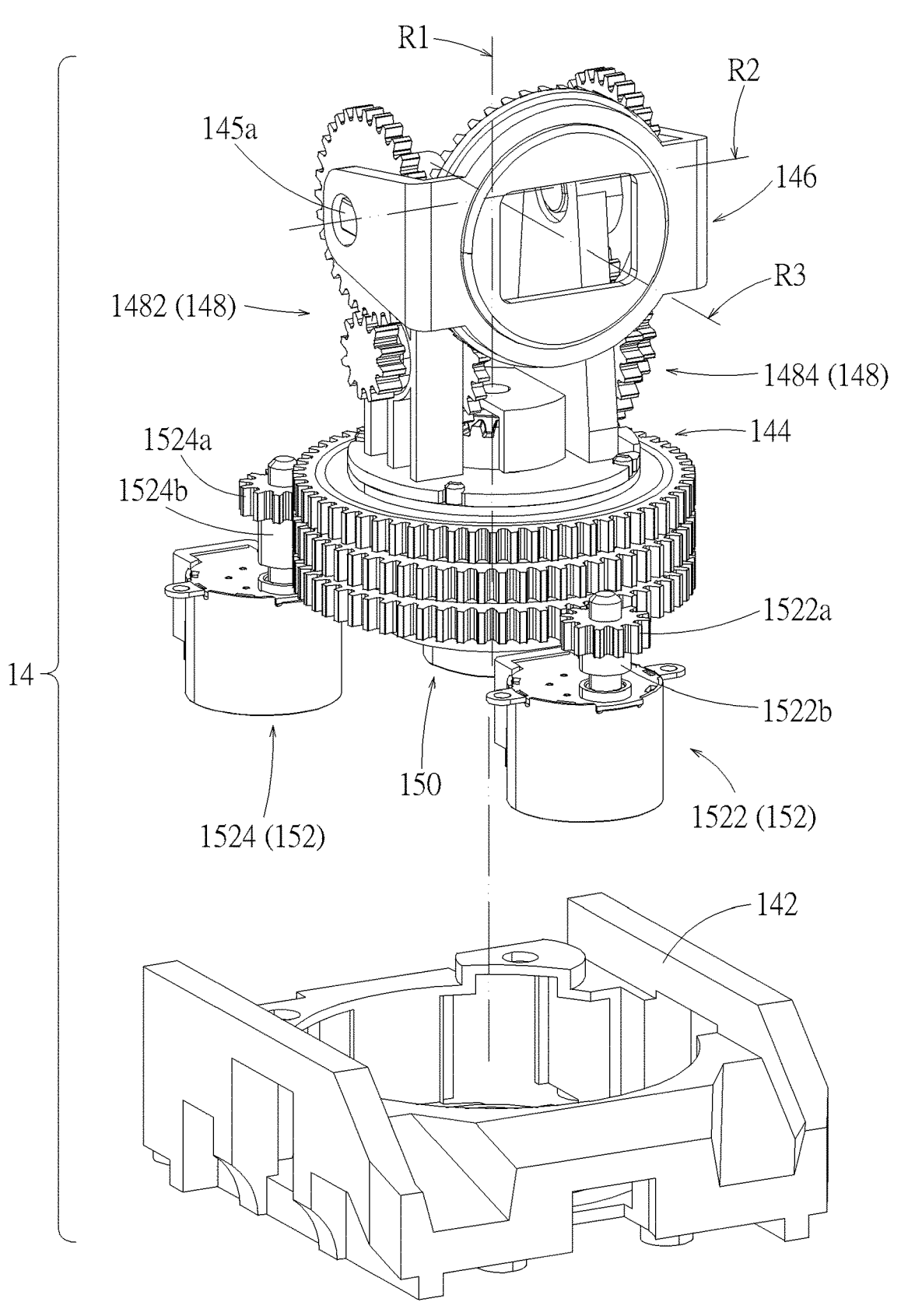
FIG. 3 is a schematic diagram of the adjustable seat in FIG. 2 from another viewpoint.

Please refer to FIG. 1, which is a schematic diagram illustrating a camera 1 according to an embodiment; therein, some components of the camera 1 are not shown in FIG. 1 to facilitate observation of the mechanical connection relationship of the structural parts. In the embodiment, the camera 1 includes an image-capturing module 12 (shown as a dashed block in FIG. 1) and an adjustable seat 14 carrying the image-capturing module 12. The image-capturing module 12 (such as but not limited to using a CMOS sensor) is used to capture images, and the adjustable seat 14 can provide a three-dimensional adjustment of the image-capturing module 12. In other words, through the adjustable seat 14, the image-capturing module 12 can rotate around first, second and third rotation axis R1, R2 and R3 (indicated by chain lines in the figure), thereby producing the effect of adjusting the image-capturing direction 12*a* of the image-capturing module 12 (parallel to its optical axis). Therein, when the image-capturing module 12 rotates around the first rotation axis R1, the effect of the imaging module 12 swinging left and right (pan) or rotating horizontally is achieved. When the image-capturing module 12 rotates around the second rotation axis R2, the effect of the image-capturing module 12 swinging up and down (tilt) or vertically rotating is achieved. When the image-capturing module 12 rotates around the third rotation axis R3, the effect of the image-capturing module 12 rotating around a direction parallel to its optical axis is achieved. In the embodiment, the optical axis of the image-capturing module 12 coincides with the third rotation axis R3, so when the image-capturing module 12 rotates around the third rotation axis R3, the image-capturing module 12 rotates around its optical axis. However, it is not limited thereto in practice.

Please refer to FIG. 2 to FIG. 5. The adjustable seat 14 includes a mount 142, a rotary base 144, a rotary fixing frame 146, a fixing frame transmission mechanism 148, a base driving device 150, and a fixing frame driving module 152. The rotary base 144 is rotatably connected to the mount 142, so that the rotary base 144 is rotatable around the first rotation axis R1 relative to the mount 142. The base driving device 150 is disposed on the mount 142 and connects with the rotary base 144 to drive the rotary base 144 to rotate around the first rotation axis R1 relative to the mount 142. The rotary fixing frame 146 is rotatably connected to the rotary base 144, so that the rotary fixing frame 146 is rotatable around the second rotation axis R2 relative to the rotary base 144. The fixing frame transmission mechanism 148 connects with the rotary fixing frame 146. The fixing frame driving module 152 is disposed on the mount 142 and connects with the fixing frame transmission mechanism 148 to drive the rotary fixing frame 146 through the fixing frame transmission mechanism 148 to rotate around the second rotation axis R2 or the third rotation axis R3 relative to the rotary base 144.

Figure 6:
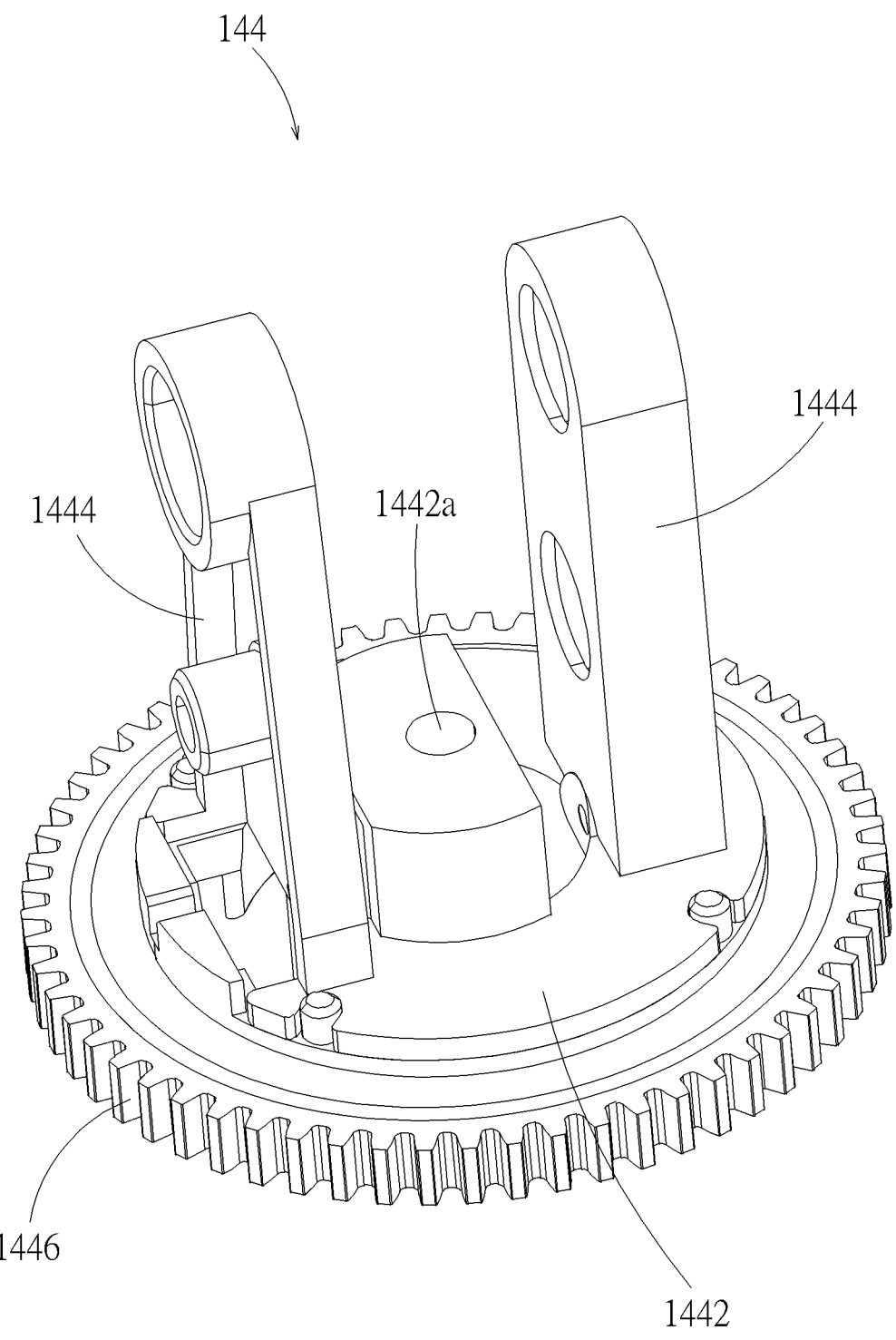
FIG. 6 is a schematic diagram of a rotary base of the adjustable seat in FIG. 2.
Figure 7:
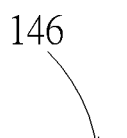
FIG. 7 is a schematic diagram of a rotary fixing frame of the adjustable seat in FIG. 2.
Figure 7:
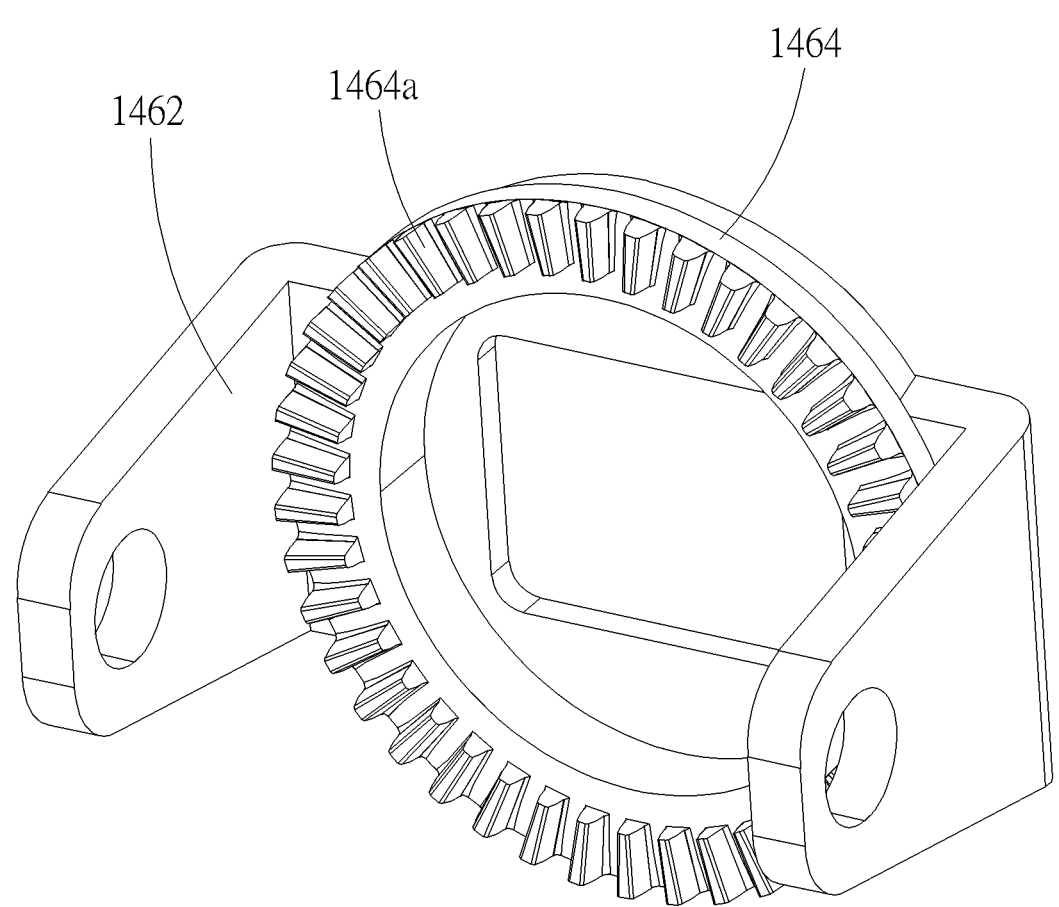
Figure 8:
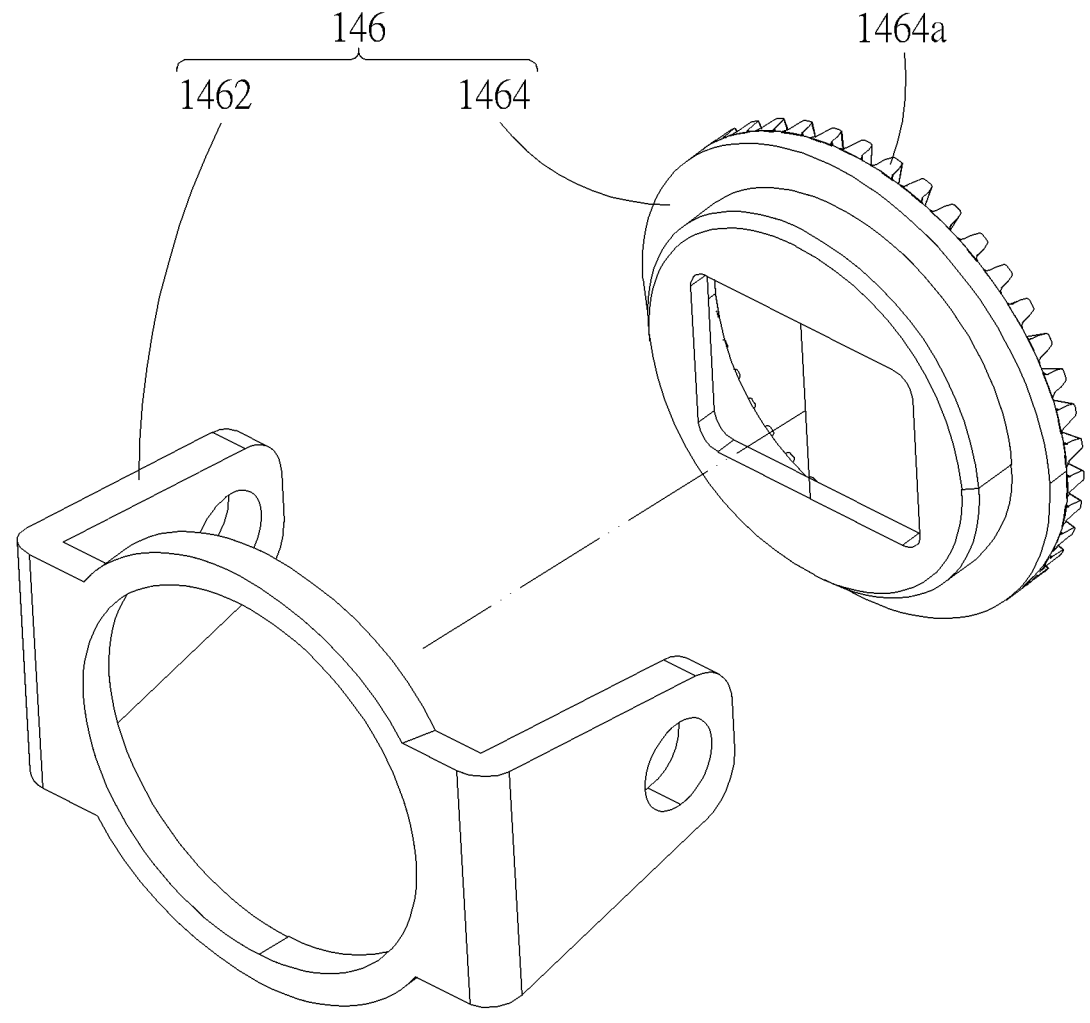
FIG. 8 is an exploded view of the rotary fixing frame in FIG. 7.
Figure 9:
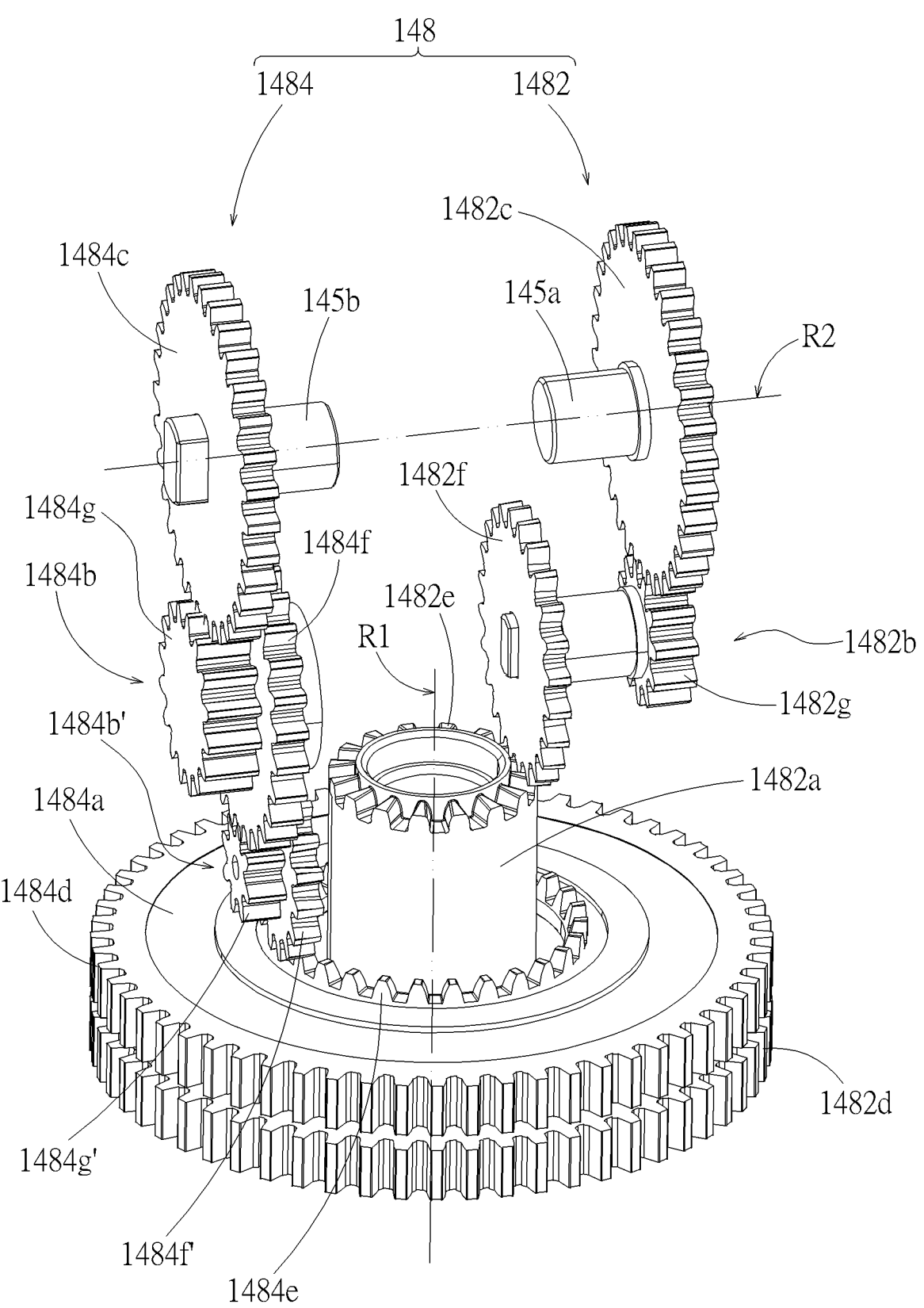
FIG. 9 is a schematic diagram of a fixing frame transmission mechanism of the adjustable seat in FIG. 2.
Figure 10:
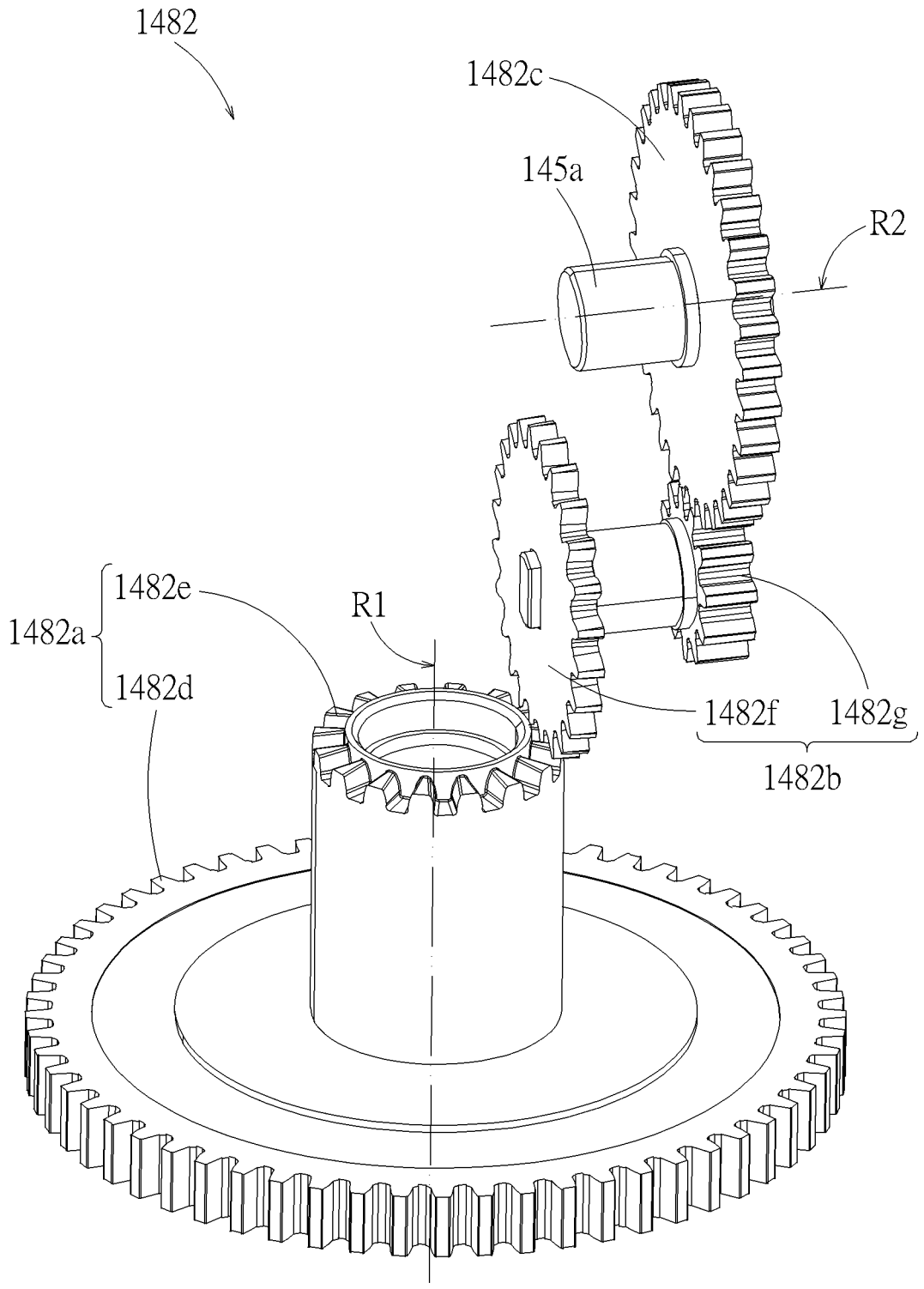
FIG. 10 is a schematic diagram of a first transmission mechanism of the fixing frame transmission mechanism in FIG. 9.
Figure 11:
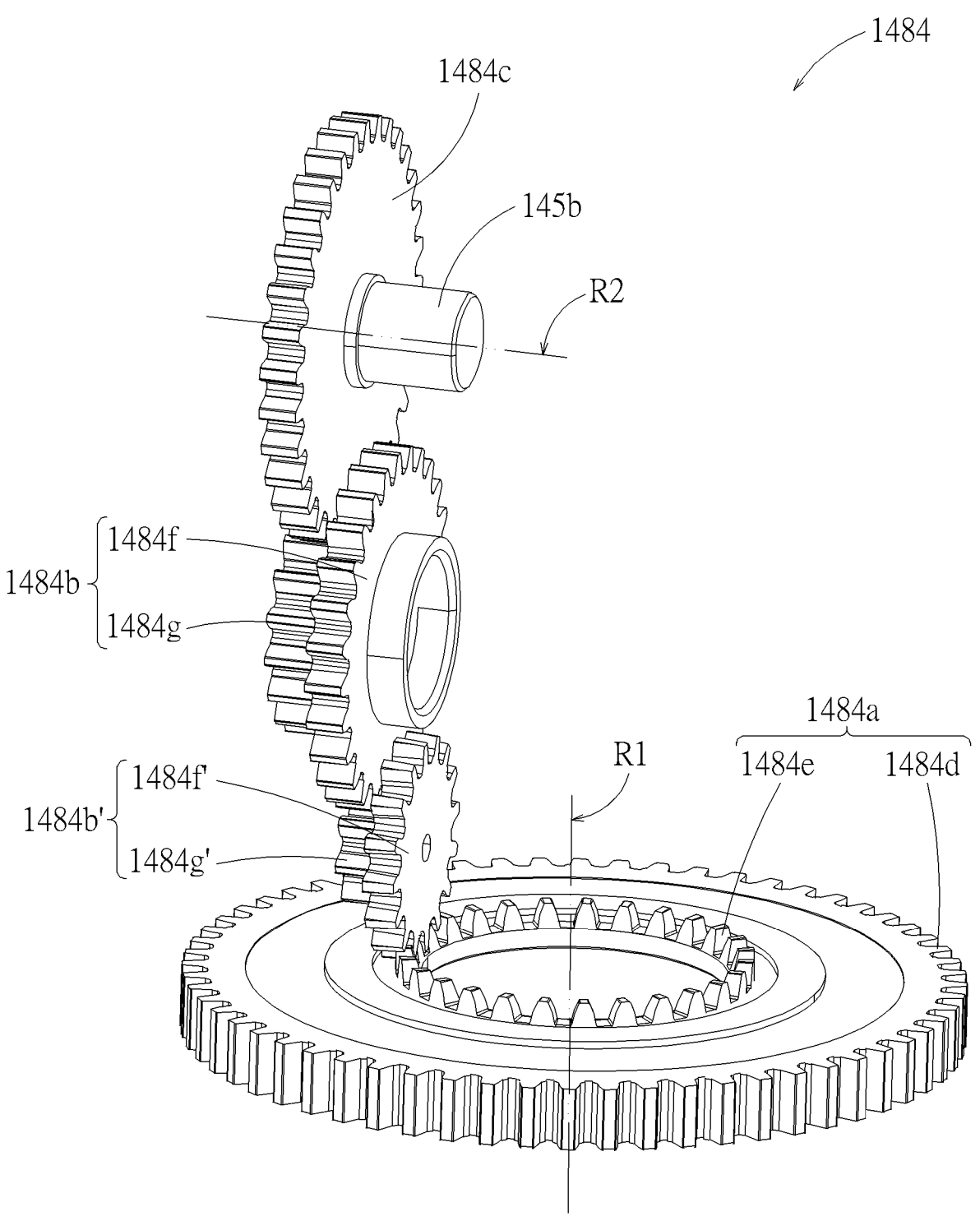
FIG. 11 is a schematic diagram of a second transmission mechanism of the fixing frame transmission mechanism in FIG. 9.

Further, please refer to FIG. 6. The rotary base 144 as a whole has a base body 1442 arranged approximately horizontally (perpendicular to the first rotation axis R1) and two opposite supports 1444 extending upward from the base body 1442. The rotary base 144 is indirectly supported on mount 142 (as explained later). The rotary base 144 also has a ring gear 1446 arranged on the base body 1442 and extends around the first rotation axis R1. The base driving device 150 meshes with the ring gear 1446 to rotate the rotary base 144 (or the base body 1442 thereof). In the embodiment, the base driving device 150 meshes with the ring gear 1446 of the rotary base 144 through a pinion 1502 (fixed on a rotary shaft 1504 of the base driving device 150). In practice, the base driving device 150 can be implemented by a combination of a motor (such as a servo motor) and a reduction mechanism (such as but not limited to a planetary gear set, a worm gear/worm set). In practice, the connection between the base driving device 150 and the rotary base 144 can also be implemented by belts, toothed belts, chains, worm gear/worm sets and other mechanisms that can transmit motion. In addition, in the embodiment, the ring gear 1446 and pinion 1502 can also be implemented by bevel gears.

Please refer to FIG. 2 to FIG. 5, FIG. 7 and FIG. 8. The rotary fixing frame 146 includes a main body 1462 and a fixing portion 1464. The main body 1462 is rotatably connected to the rotary base 144, so that the main body 1462 is rotatable around the second rotation axis R2 relative to the rotary base 144; therein, the main body 1462 as a whole is a U-shaped structure, of which two arms are pivotally connected to the supports 1444 of the rotary base 144 (e.g., through pivot shafts 145*a* and 145*b*), respectively. The fixing portion 1464 is rotatably connected to the main body 1462, so that the main body 1462 is rotatable around the third rotation axis R3 relative to the main body 1462. The image-capturing module 12 is fixed on the fixing portion 1464 and will rotate relative to the main body 1462 along with the fixing portion 1464. The fixing portion 1464 has a ring gear 1464*a* to connect with the fixing frame transmission mechanism 148 (referring to FIG. 1).

Please refer to FIG. 2 to FIG. 5 and FIG. 9 to FIG. 11. The fixing frame transmission mechanism 148 includes a first transmission mechanism 1482 and a second transmission mechanism 1484. The first transmission mechanism 1482 includes a first input transmission member 1482*a*, a first intermediate transmission member 1482*b*, and a first gear 1482*c*. Therein, the first input transmission member 1482*a* is substantially horizontally (perpendicular to the first rotation axis R1) directly and rotatably disposed (for example, but not limited to, through a thrust bearing 154*a*) on the mount 142. The first input transmission member 1482*a* has a ring gear 1482*d* and a crown gear 1482*e*. The first input transmission member 1482*a* connects with the fixing frame driving module 152 through the ring gear 1482*d* and connects with the intermediate transmission member 1482*b* through the crown gear 1482*e*. The first intermediate transmission member 1482*b* is pivotally connected to the support 1444 of the rotary base 144. The first intermediate transmission member 1482*b* includes a driven gear 1482*f* and a driving gear 1482*g* fixedly connected to the driven gear 1482*f*. The pitch circle diameter of the driven gear 1482*f* is larger than the pitch circle diameter of the driving gear 1482*g*. The driven gear 1482*f* meshes with the crown gear 1482*e*. The first intermediate transmission member 1482*b* connects with the first gear 1482*c* through the driving gear 1482*g*. The first gear 1482*c* is pivotally connected to the main body 1462 of the rotary fixing frame 146 and the support 1444 of the rotary base 144 at the same time (through the pivot shaft 145*a*). The first gear 1482*c* meshes with the driving gear 1482*g*. The first gear 1482*c* also meshes with the ring gear 1464*a* of the fixing portion 1464 of the rotary fixing frame 146.

The second transmission mechanism 1484 includes a second input transmission member 1484*a*, two second intermediate transmission members 1484*b* and 1484*b*', and a second gear 1484*c*. A main difference between the transmission mechanism of the second transmission mechanism 1484 and the transmission mechanism of the first transmission mechanism 1482 is that the second transmission mechanism 1484 uses two intermediate transmission members (i.e., the second intermediate transmission members 1484*b* and 1484*b*'). Therein, the second input transmission member 1484*a* is substantially horizontally (perpendicular to the first rotation axis R1) directly and rotatably disposed (for example, but not limited to, through a thrust bearing 154*b*) on the first input transmission member 1482*a*, i.e., indirectly and rotatably disposed on the mount 142. The second input transmission member 1484*a* has a ring gear 1484*d* and a crown gear 1484*e*. The second input transmission member 1484*a* connects with the fixing frame driving module 152 through the ring gear 1484*d* and connects with the intermediate transmission member 1482*b*' through the crown gear 1484*e*. The second intermediate transmission members 1484*b* and 1484*b*' are pivotally connected to the supports 1444 of the rotary base 144 respectively. The second intermediate transmission member 1484*b* includes a driven gear 1484*f* and a driving gear 1484*g* fixedly connected to the driven gear 1484*f*. The pitch circle diameter of the driven gear 1484*f* is larger than the pitch circle diameter of the driving gear 1484*g*. The second intermediate transmission member 1484*b* connects with the second gear 1484*c* through the driving gear 1484*g*. The second intermediate transmission member 1484*b*' also includes a driven gear 1484*f*' and a driving gear 1484*g*' fixedly connected to the driven gear 1484*f*'. The pitch circle diameter of the driven gear 1484*f*' is larger than the pitch circle diameter of the driving gear 1484*g*'. The driven gear 1484*f*' meshes with the crown gear 1484*e*. The driving gear 1484*g*' meshes with the driven gear 1484*f* of the second intermediate transmission member 1484*b*. The first gear 1484*c* is pivotally connected to the main body 1462 of the rotary fixing frame 146 and the support 1444 of the rotary base 144 at the same time (through the pivot shaft 145*b*). The second gear 1484*c* meshes with the driving gear 1482*g*. The second gear 1484*c* also meshes with the ring gear 1464*a* of the fixing portion 1464 of the rotary fixing frame 146.

Figure 4:
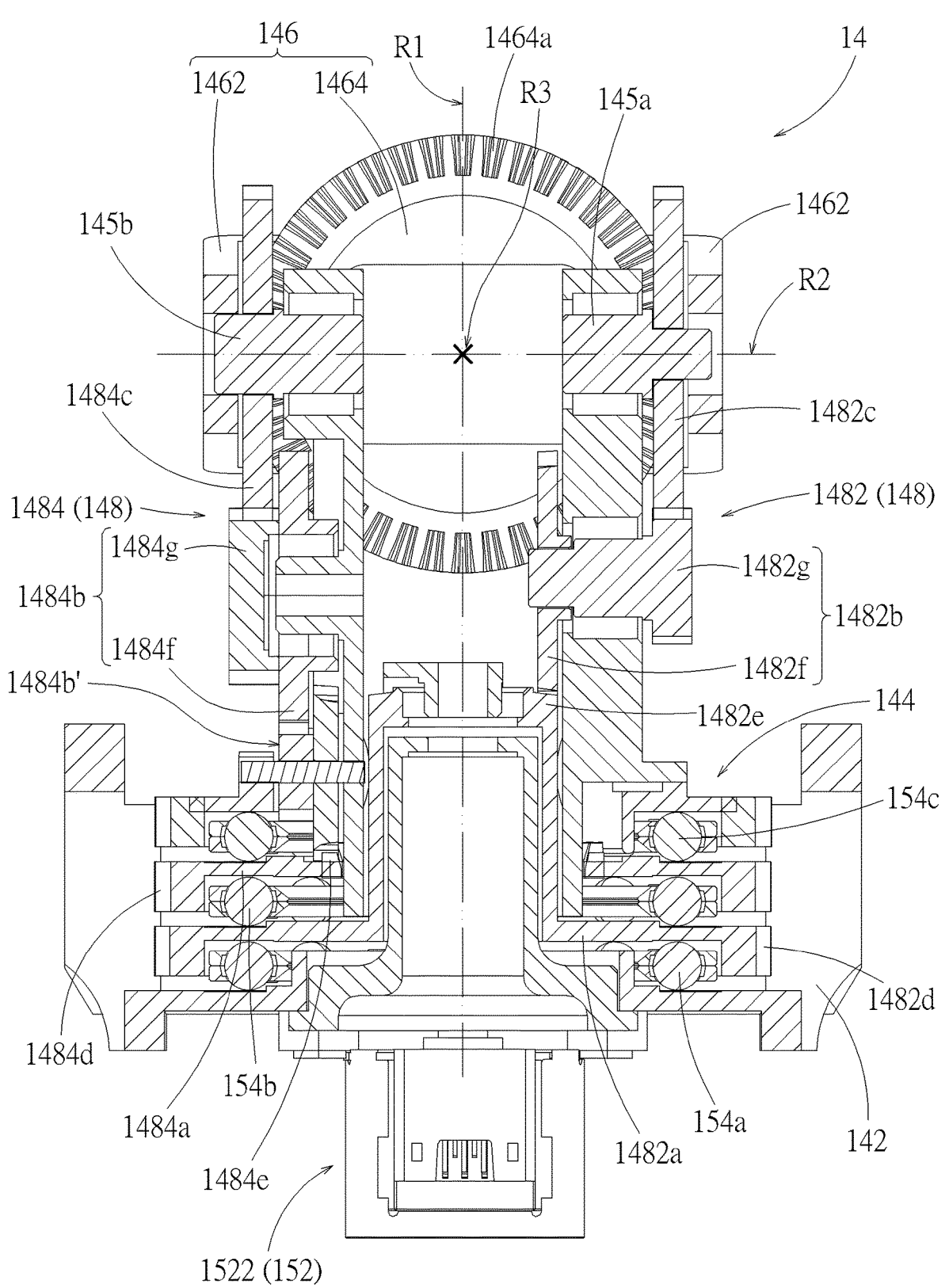
FIG. 4 is a sectional view of the adjustable seat of the camera in FIG. 1 along the line X-X.
Figure 5:
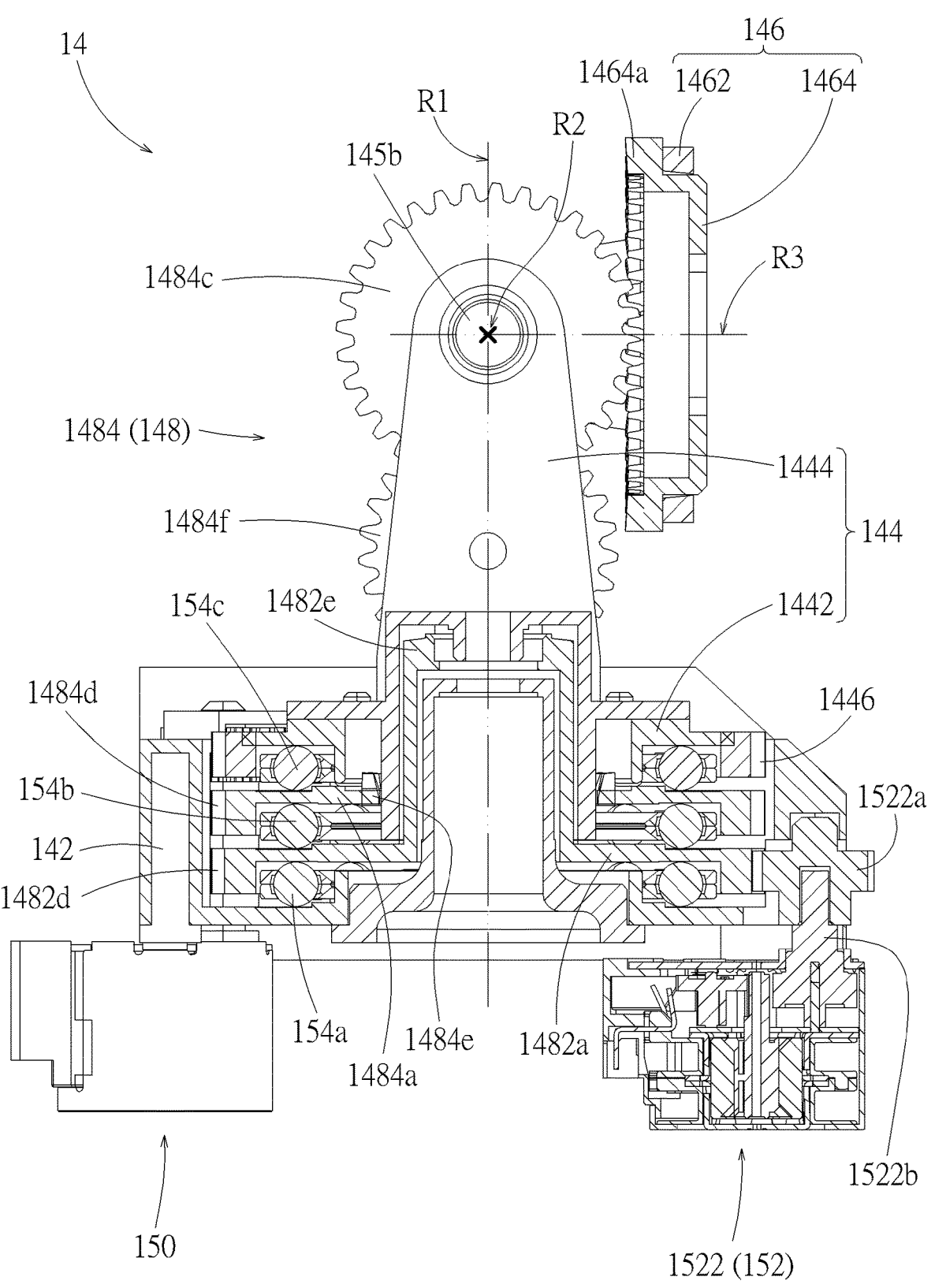
FIG. 5 is a sectional view of the adjustable seat of the camera in FIG. 1 along the line Y-Y.

In addition, as shown by FIG. 4 and FIG. 5, the rotary base 144 (or the base body 1442 thereof) is substantially horizontally (perpendicular to the first rotation axis R1) directly and rotatably disposed (for example, but not limited to, through a thrust bearing 154*c*) on the second input transmission member 1484*a*, i.e., indirectly and rotatably disposed on the mount 142. In practice, the base body 1442 of the rotary base 144 and the second input transmission member 1484*a* can directly and rotatably disposed on the mount 142 by modifying the sizes thereof, for example, by increasing the diameters of the base body 1442 and the second input transmission member 1484*a* to varying degrees.

Please refer to FIG. 1 to FIG. 5. The fixing frame driving module 152 includes a first driving device 1522 and a second driving device 1524, which are disposed on the mount 142 and connect with the first transmission mechanism 1482 and the second transmission mechanism 1484 respectively. The first driving device 1522 meshes with the ring gear 1482*d* of the first input transmission member 1482*a* through a pinion 1522*a* (fixed on a rotary shaft 1522*b* of the first driving device 1522). The second driving device 1524 meshes with the ring gear 1484*d* of the second input transmission member 1484*a* through a pinion 1524*a* (fixed on a rotary shaft 1524*b* of the second driving device 1524). In the embodiment, the first driving device 1522 and the second driving device 1524 have the same structural logic as the base driving device 150. Therefore, for other descriptions about the first driving device 1522 and the second driving device 1524, please refer to the above descriptions relative to the base driving device 150 and variants thereof (including the connection structure between it with the rotary base 144), which will not be described in addition.

As mentioned above about the structure of camera 1, In practical applications, by controlling the operation of the base driving device 150, the rotary base 144 can be driven to rotate around the first rotation axis R1 relative to the mount 142, thereby producing the effect of the image-capturing module 12 swinging left and right (or rotating horizontally). Therein, in practice, if the image-capturing module 12 is required to only swing left and right, the rotary base 144, the first input transmission member 1482*a* and the second input transmission member 1484*a* need to rotate in the same direction and at the same speed (by controlling the operation of the base driving device 150, the first driving device 1522, and the second driving device 1524). By controlling the operation of the first driving device 1522 and the second driving device 1524 at the same time, the rotary fixing frame 146 can be driven through the first transmission mechanism 1482 and the second transmission mechanism 1484 to rotate around the second rotation axis R2 relative to the rotary base 144 or the fixing portion 1464 of the rotary fixing frame 146 can be driven through the first transmission mechanism 1482 and the second transmission mechanism 1484 to rotate around the third rotation axis R3 relative to the main body 1462 of the rotary fixing frame 146, so as to correspondingly produce the effect of the image-capturing module 12 swinging up and down (or vertically rotating) or rotating around a direction parallel to its optical axis. Therein, when the first gear 1482*c* and the second gear 1848*c* rotates in the same direction and at the same speed (in the embodiment, by making the first input transmission member 1482*a* and the second input transmission member 1484*a* rotate in the same direction), the fixing portion 1464 will not rotate relative to the main body 1462, causing the fixing portion 1464 (together with the image-capturing module 12) and the main body 1462 to become one and rotate relative to the rotary base 144 (around the second rotation axis R2). For example, the first gear 1482*c* and the second gear 1484*c* rotate in a first direction and at the same speed, causing the rotary fixing frame 146 (together with the image-capturing module 12) to rotate vertically upward; the first gear 1482*c* and the second gear 1484*c* rotate in a direction opposite to the first direction and at the same speed, causing the rotary fixing frame 146 to rotate vertically downward. When the first gear 1482*c* and the second gear 1484*c* rotate in opposite directions and at the same rate (in the embodiment, which is achieved through the first input transmission member 1482*a* and the second input transmission member 1484*a*), the fixing portion 1464 (together with the image-capturing module 12) will rotate relative to the main body 1462 (around the third rotation axis R3) and the main body 1462 will not rotate relative to the rotary base 144. Therefore, when the first gear 1482*c* and the second gear 1484*c* rotate in different directions and at different speeds, the adjustment effect (or rotation effect) produced on the image-capturing module 12 is a combination of the aforementioned effects. In practice, for example, the image-capturing module 12 can be adjusted to a desired orientation quickly, or even all at once (e.g., by synchronously controlling the operation of the driving devices 150, 1522 and 1524), by use of the relationship between the rotation angle position of the servo motor of each driving device 150, 1522 and 1524 and the orientation of the fixing portion 1464 of the rotary fixing frame 146 (that is, the orientation of the image-capturing module 12).

As described above, the adjustment of the capturing direction 12*a* of the image-capturing module 12 (or the orientation thereof) can be implemented by controlling the operation of the base driving device 150, the first driving device 1522 and the second driving device 1524. Furthermore, in the embodiment, the base driving device 150, the first driving device 1522, and the second driving device 1524 are all disposed on the non-rotating mount 142, so the rotational inertia of the rotation base 144 and the rotation fixing frame 146 will not be affected by these driving devices. This structural configuration facilitates precise and rapid adjustment. Furthermore, the base driving device 150, the first driving device 1522, and the second driving device 1524 are all disposed on the mount 142, so their connection cables do not need to be arranged on the other movable parts (such as the rotary base 144 and the rotary fixing frame 146), reducing the restriction on the layout of the connection cables of the image-capturing module 12, and reducing the interference to the movement of the movable parts (such as the rotary base 144 and the rotary fixing frame 146). For example, the connection cables of the image-capturing module 12 can easily pass through the through hole 1442*a* in the middle of the base body 1442 to reach the inside or below of the mount 142.

In addition, in the embodiment, the gear set is used as an example to illustrate the fixing frame transmission mechanism 148, but it is not limited thereto in practice. For example, belts, toothed belts, chains, worm gear/worm sets, connecting rod groups and other mechanisms that can transmit motion can also be used in the fixing frame transmission mechanism. Furthermore, in the embodiment, the first transmission mechanism 1482 and the second transmission mechanism 1484 both connect with the fixing portion 1464 of the rotary fixing frame 146, and both can be used to control the rotation of the entire rotary fixing frame 146 and the rotation of the fixing portion 1464 itself. Therein, since the first transmission mechanism 1482 and the second transmission mechanism 1484 are connected to the opposite sides of the rotary fixing frame 146 (in which the first gear 1482*c* and the second gear 1484*c* are located on the opposite sides of the ring gear 1464*a* respectively), the force on the fixing frame 146 is symmetrical, which helps to improve the rotational stability of the entire fixing bracket 146 and the rotational stability of the fixing portion 1464 itself. However, it is not limited thereto in practice. For example, based on the structure of the camera 1 (referring to FIG. 1), the first gear 1482*c* can be changed not to mesh with the ring gear 1464*a* of the fixing portion 1464, but to be fixed with the main body 1462 of the rotary fixing frame 146. In this example, the first transmission mechanism 1482 is mainly used to drive the main body 1462 to rotate around the second rotation axis R2 relative to the rotary base 144 to produce the effect of swinging up and down; the second transmission mechanism 1484 is mainly used to drive the fixing portion

1464 to rotate around the third rotation axis R3 relative to the main body 1462 to produce the effect of rotating around a direction parallel to the optical axis (of the image-capturing module 12).

In addition, in the above embodiment, the camera 1 provides three-dimensional adjustments; however, it is not limited thereto in practice. For example, based on the structure of the camera 1 (referring to FIG. 1), the first gear 1482*c* can be changed not to mesh with the ring gear 1464*a* of the fixing portion 1464, but to be fixed with the main body 1462 of the rotary fixing frame 146. Further, the second transmission mechanism 1484 is cancelled, and the fixing portion 1464 is fixed with the main body 1462. In this example, the camera provides two-dimensional adjustments (left and right swing and up and down swing).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An adjustable seat, comprising:
a mount;
a rotary base rotatably connected to the mount, the rotary base being rotatable around a first rotation axis relative to the mount;
a rotary fixing frame, the rotary fixing frame comprising a main body and a fixing portion, the main body being rotatably connected to the rotary base around a second rotation axis relative to the rotary base, the fixing portion being rotatably connected to the main body around a third rotation axis relative to the main body;
a fixing frame transmission mechanism, the fixing frame transmission mechanism comprising a first transmission mechanism and a second transmission mechanism, the first transmission mechanism and the second transmission mechanism both directly connecting with the fixing portion; and
a fixing frame driving module disposed on the mount, the fixing frame driving module comprising a first driving device and a second driving device, the first driving device and the second driving device connecting with the first transmission mechanism and the second transmission mechanism respectively, the first driving device and the second driving device both driving the fixing portion through the first transmission mechanism and the second transmission mechanism to selectively rotate the fixing portion around the third rotation axis relative to the main body or rotate the fixing portion together with the main body around the second rotation axis relative to the rotary base.

2. The adjustable seat according to claim 1, wherein the fixing frame transmission mechanism comprises at least one intermediate transmission member rotatably disposed on the rotary base.

3. The adjustable seat according to claim 2, wherein the fixing frame transmission mechanism comprises an input transmission member rotatably disposed on the mount, and the fixing frame driving module connects with the input transmission member.

4. The adjustable seat according to claim 1, further comprising a base driving device disposed on the mount, wherein the base driving device connects with the rotary base, and the base driving device drives the rotary base to rotate around the first rotation axis relative to the mount.

5. The adjustable seat according to claim 4, wherein the rotary base has a ring gear that extends around the first rotation axis, and the base driving device meshes with the ring gear.

6. The adjustable seat according to claim 1, wherein the fixing portion has a ring gear, the first transmission mechanism comprises a first gear rotatably connected to the main body, the first gear meshes with the ring gear to drive the fixing portion to rotate around the third rotation axis relative to the main body, the second transmission mechanism comprises a second gear rotatably connected to the main body, and the second gear meshes with the ring gear to drive the fixing portion to rotate around the third rotation axis relative to the main body.

7. The adjustable seat according to claim 6, wherein the first gear and the second gear are located on opposite sides of the ring gear.

8. The adjustable seat according to claim 1, wherein the first transmission mechanism comprises a first input transmission member rotatably disposed on the mount, the first driving device connects with the first input transmission member, the second transmission mechanism comprises a second input transmission member rotatably disposed on the first input transmission member, and the second driving device connects with the second input transmission member.

9. A camera, comprising:

an adjustable seat, comprising:
  a mount;
  a rotary base rotatably connected to the mount, the rotary base being rotatable around a first rotation axis relative to the mount;
  a rotary fixing frame, the rotary fixing frame comprising a main body and a fixing portion, the main body being rotatably connected to the rotary base around a second rotation axis relative to the rotary base, the fixing portion being rotatably connected to the main body around a third rotation axis relative to the main body;
  a fixing frame transmission mechanism, the fixing frame transmission mechanism comprising a first transmission mechanism and a second transmission mechanism, the first transmission mechanism and the second transmission mechanism both directly connecting with the fixing portion; and
  a fixing frame driving module disposed on the mount, the fixing frame driving module comprising a first driving device and a second driving device, the first driving device and the second driving device connecting with the first transmission mechanism and the second transmission mechanism respectively, the first driving device and the second driving device both driving the fixing portion through the first transmission mechanism and the second transmission mechanism to selectively rotate the fixing portion around the third rotation axis relative to the main body or rotate the fixing portion together with the main body around the second rotation axis relative to the rotary base; and an image-capturing module fixed on the fixing portion of the rotary fixing frame for capturing images.

10. The camera according to claim 9, wherein the fixing frame transmission mechanism comprises at least one intermediate transmission member rotatably disposed on the rotary base.

11. The camera according to claim 10, wherein the fixing frame transmission mechanism comprises an input transmission member rotatably disposed on the mount, and the fixing frame driving module connects with the input transmission member.

12. The camera according to claim 9, wherein the adjustable seat comprises a base driving device disposed on the mount, the base driving device connects with the rotary base, and the base driving device drives the rotary base to rotate around the first rotation axis relative to the mount.

13. The camera according to claim 12, wherein the rotary base has a ring gear that extends around the first rotation axis, and the base driving device meshes with the ring gear.

14. The camera according to claim 9, wherein the fixing portion has a ring gear, the first transmission mechanism comprises a first gear rotatably connected to the main body, the first gear meshes with the ring gear to drive the fixing portion to rotate around the third rotation axis relative to the main body, the second transmission mechanism comprises a second gear rotatably connected to the main body, and the second gear meshes with the ring gear to drive the fixing portion to rotate around the third rotation axis relative to the main body.

15. The camera according to claim 14, wherein the first gear and the second gear are located on opposite sides of the ring gear.

16. The camera according to claim 9, wherein the first transmission mechanism comprises a first input transmission member rotatably disposed on the mount, the first driving device connects with the first input transmission member, the second transmission mechanism comprises a second input transmission member rotatably disposed on the first input transmission member, and the second driving device connects with the second input transmission member.

* * * * *